United States Patent
Go et al.

(10) Patent No.: US 11,115,827 B2
(45) Date of Patent: *Sep. 7, 2021

(54) METHOD FOR TRANSMITTING AND RECEIVING DATA IN A WIRELESS COMMUNICATION SYSTEM AND APPARATUS THEREFOR

(71) Applicant: LG ELECTRONICS INC., Seoul (KR)

(72) Inventors: Seongwon Go, Seoul (KR); Hyungtae Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,027

(22) Filed: Feb. 19, 2020

(65) Prior Publication Data

US 2020/0187012 A1    Jun. 11, 2020

Related U.S. Application Data

(63) Continuation of application No. 16/540,563, filed on Aug. 14, 2019, now Pat. No. 10,609,566, which is a (Continued)

(51) Int. Cl.
*H04W 16/12* (2009.01)
*H04W 72/04* (2009.01)
(Continued)

(52) U.S. Cl.
CPC ............. *H04W 16/12* (2013.01); *H04L 5/001* (2013.01); *H04L 5/0039* (2013.01);
(Continued)

(58) Field of Classification Search
CPC ...................................................... H04W 16/12
(Continued)

(56) References Cited

U.S. PATENT DOCUMENTS 10,609,566 B2 * 3/2020 Go ...................... H04W 72/046
2017/0034740 A1 2/2017 Alvarino et al.
(Continued)

FOREIGN PATENT DOCUMENTS

EP          2378698         10/2011
KR       1020120103619       9/2012
(Continued)

OTHER PUBLICATIONS

3rd Generation Partnership Project; InterDigital Inc., "On Dynamic PRG Size Configuration in NR," R1-1718479, 3GPP TSG RAN WG1, Prague, Czech Republic, dated Oct. 2017, 4 pages.
(Continued)

*Primary Examiner* — Peter G Solinsky
(74) *Attorney, Agent, or Firm* — Fish & Richardson P.C.

(57) ABSTRACT

Provided are a method for a UE to transmit and receive data in a wireless communication system and an apparatus therefor. The UE receives downlink control information from a base station. The downlink control information includes an indicator for configuring the bundling size of a downlink shared channel. The UE receives downlink data from the base station through a downlink shared channel configured based on the downlink control information. The bundling size may be configured based on a value of the indicator.

15 Claims, 11 Drawing Sheets

Related U.S. Application Data continuation of application No. 16/186,291, filed on Nov. 9, 2018, now Pat. No. 10,433,178.

(60) Provisional application No. 62/590,393, filed on Nov. 24, 2017, provisional application No. 62/587,505, filed on Nov. 17, 2017, provisional application No. 62/585,532, filed on Nov. 13, 2017, provisional application No. 62/584,106, filed on Nov. 9, 2017.

(51) Int. Cl.

| | | |
|---|---|---|
| *H04W 16/14* | (2009.01) | |
| *H04W 24/10* | (2009.01) | |
| *H04W 76/27* | (2018.01) | |
| *H04L 12/26* | (2006.01) | |
| *H04L 5/00* | (2006.01) | |
| *H04B 7/0452* | (2017.01) | |
| *H04L 5/14* | (2006.01) | |
| *H04B 7/06* | (2006.01) | |
| *H04B 7/08* | (2006.01) | |

(52) U.S. Cl.
CPC .......... *H04L 5/0044* (2013.01); *H04L 5/0064* (2013.01); *H04L 5/0094* (2013.01); *H04L 43/16* (2013.01); *H04W 16/14* (2013.01); *H04W 24/10* (2013.01); *H04W 72/042* (2013.01); *H04W 72/046* (2013.01); *H04W 72/0446* (2013.01); *H04W 72/0453* (2013.01); *H04W 76/27* (2018.02); *H04B 7/0452* (2013.01); *H04B 7/0695* (2013.01); *H04B 7/088* (2013.01); *H04L 5/0023* (2013.01); *H04L 5/0048* (2013.01); *H04L 5/14* (2013.01)

(58) Field of Classification Search
USPC ....................................................... 370/329
See application file for complete search history.

(56) References Cited

U.S. PATENT DOCUMENTS

| | | |
|---|---|---|
| 2018/0145809 A1 | 5/2018 | Kwak et al. |
| 2019/0132862 A1 | 5/2019 | Jeon et al. |

FOREIGN PATENT DOCUMENTS

| | | |
|---|---|---|
| KR | 102044539 | 11/2019 |
| RU | 2494551 | 3/2012 |

OTHER PUBLICATIONS

3rd Generation Partnership Project; vivo; "Summary of Offline Discussions on DL PRB Bundling," R1-1719072, 3GPP TSG RAN WG1, Prague, Czech, dated Oct. 2017, 4 pages.
$3^{rd}$ Generation Partnership Project; Xinwei; "Summary of Issues on DL PRB bundling," R1-1706607, 3GPP TSG RAN WG1, Spokane, USA, dated Apr. 2017, 2 pages.
Extended European Search Report in European Appln. No. 18833594.7, dated Apr. 28, 2020, 8 pages.
Office Action in Chilean Appln. No. 1444-2019, dated Mar. 12, 2020, 25 pages (with English translation).
Russian Office Action in Russian Appln. No. 2020115421, dated Oct. 21, 2020, 14 pages (with English translation).
Vivo, "Discussion on PRB Bundling for DL," R1-1717469, 3GPP TSG RAN WG1 Meeting #90bis, Prague, CZ, Oct. 9-13, 2017, 6 pages.
3rd Generation Partnership Project; Technical Specification Group Radio Access Network, "NR; Physical layer procedures for data (Release 15)," 3GPP TS 38.214 V1.1.2, Nov. 2017, 57 pages.
InterDigital et al., WF on usage of ! bit DCI, R1-1719147, 3GPP TSG RAN WG1 Meeting NR 90bis R1-1719147, Prague, Czech, Oct. 9-13, 2017, Agenda item: 7.2.1.4, 3 pages.
Japanese Office Action in Japanese Appln. No. 2019-536282, dated Jun. 23, 2020, 7 pages (with English translation).
LG Electronics, Discussion on PRB bundling, R1-1719904, 3GPP TSG RAN WG1 Meeting #91, Reno, Nevada, USA, Nov. 27-Dec. 1, 2017, 2 pages.

\* cited by examiner

METHOD FOR TRANSMITTING AND RECEIVING DATA IN A WIRELESS COMMUNICATION SYSTEM AND APPARATUS THEREFOR

CROSS-REFERENCE TO RELATED APPLICATIONS

This application is a continuation of U.S. application Ser. No. 16/540,563, filed on Aug. 14, 2019, which is a continuation of U.S. application Ser. No. 16/186,291, filed on Nov. 9, 2018, which claims benefit to Provisional Application No. 62/584,106 filed on Nov. 9, 2017, No. 62/585,532 field on Nov. 13, 2017, No. 62/587,505 filed on Nov. 17, 2017 and No. 62/590,393 filed on Nov. 24, 2017 in US the entire contents of which is hereby incorporated by reference in its entirety.

BACKGROUND OF THE INVENTION

Field of the Invention

The present invention relates to a wireless communication system and, more particularly, to a method of transmitting and receiving data and an apparatus supporting the same.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wideband, and device networking, have been researched.

SUMMARY OF THE INVENTION

The present invention provides a method of transmitting and receiving data in a wireless communication system and an apparatus therefor.

In relation to the method and apparatus, this specification proposes a method of configuring bundling for a downlink shared channel (e.g., PDSCH) and an apparatus therefor.

Specifically, this specification proposes a method for dynamically configuring a bundling size for a downlink shared channel based on downlink control information (DCI) transmitted by a base station and an apparatus therefor.

Technical objects to be achieved in the present invention are not limited to the above-described technical objects, and other technical objects not described above may be evidently understood by a person having ordinary skill in the art to which the present invention pertains from the following description.

In an aspect, a method for a user terminal to transmit and receive data in a wireless communication system includes receiving downlink control information from a base station, wherein the downlink control information comprises an indicator for setting a bundling size of a downlink shared channel and receiving downlink data from the base station through the downlink shared channel configured based on the downlink control information, wherein the bundling size is set based on a value of the indicator.

Furthermore, the method further includes receiving configuration information including a plurality of bundling size sets, each set having at least one candidate value for the bundling size, from the base station.

Furthermore, in an embodiment of the present invention, when the value of the indicator is "0", a specific bundling size set having one candidate value among the plurality of bundling size sets is configured as a set for setting the bundling size. The bundling size is determined by a candidate value included in the specific bundling size set.

Furthermore, in an embodiment of the present invention, when the value of the indicator is "1", bundling size sets including two candidate values among the plurality of bundling size sets are configured as a set for setting the bundling size.

Furthermore, in an embodiment of the present invention, the bundling size is set as one of the two candidate values based on a result of a comparison between the number of physical resource blocks contiguous in a frequency axis and a threshold value.

Furthermore, in an embodiment of the present invention, when the number of contiguous physical resource blocks is greater than the threshold value, the bundling size is set as a greater value of the two candidate values.

Furthermore, in an embodiment of the present invention, when the number of contiguous physical resource blocks is smaller than the threshold value, the bundling size is set as a smaller value of the two candidate values.

Furthermore, in an embodiment of the present invention, the threshold value is a value obtained by dividing a resource block of a bandwidth for an active bandwidth part (BWP) by 2.

Furthermore, in an aspect, a method for a base station to transmit and receive data in a wireless communication system includes transmitting downlink control information to the user equipment, wherein the downlink control information comprises an indicator for setting a bundling size of a downlink shared channel and transmitting downlink data to the user equipment through the downlink shared channel configured based on the downlink control information, wherein the bundling size is set based on a value of the indicator.

Furthermore, in an aspect, a user equipment transmitting and receiving data in a wireless communication system includes a radio frequency (RF) module configured to transmit and receive radio signals and a processor functionally connected to the RF module. The processor is configured to receive downlink control information from a base station, wherein the downlink control information comprises an indicator for setting a bundling size of a downlink shared channel and to receive downlink data from the base station through the downlink shared channel configured based on the downlink control information. The bundling size is set based on a value of the indicator.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed description.

DESCRIPTION OF EXEMPLARY EMBODIMENTS

Figure 1:
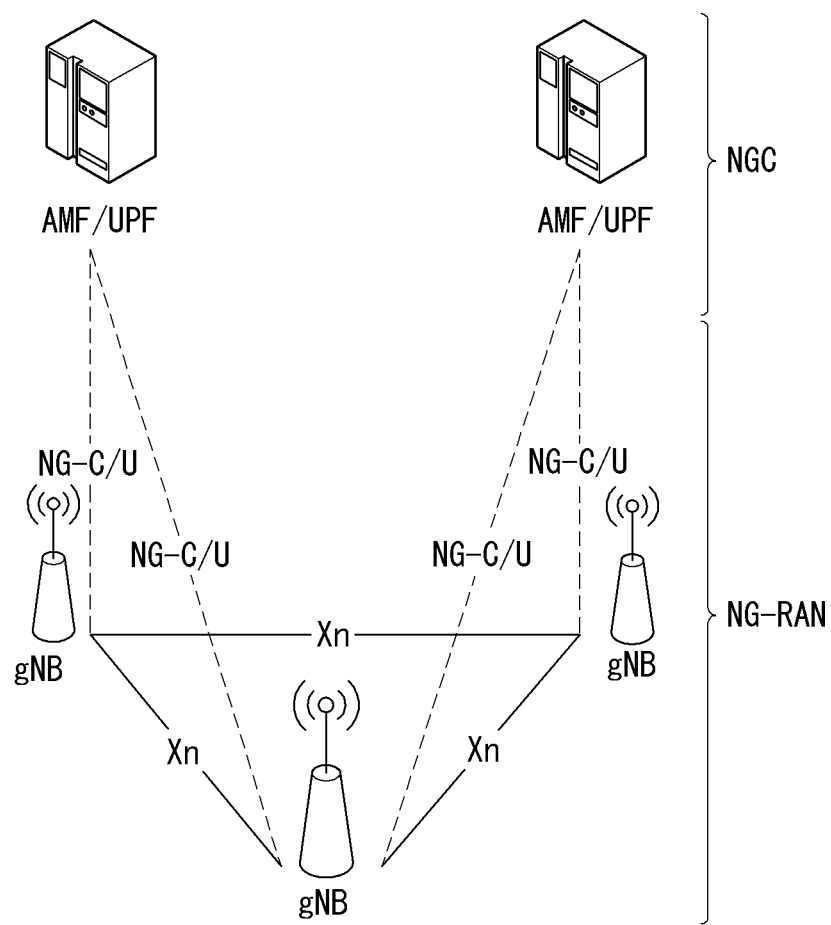
FIG. 1 is a diagram illustrating an example of an overall system structure of NR to which a method proposed in the present specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP) gNB (next generation NB, general NB, gNodeB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/NR (New RAT) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface
General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected regardless of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

Figure 2:
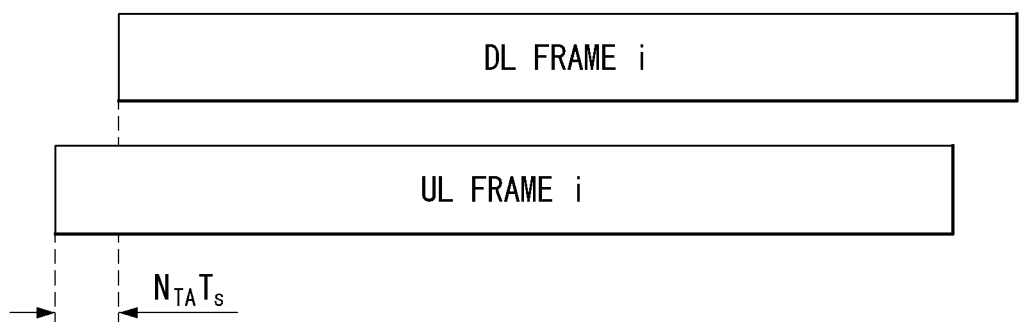
FIG. 2 illustrates a relationship between an uplink frame and a downlink frame in a wireless communication system to which the method proposed in the present specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_s$ before the start of a corresponding DL frame in the UE.

Regarding the numerology μ, slots are numbered in ascending order of $n_s^\mu \in \{0, \ldots, N_{subframe}^{slots,\mu} - 1\}$ in a subframe, and in ascending order of $n_{s,f}^\mu \in \{0, \ldots, N_{frame}^{slots,\mu} - 1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{sym}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots\mu}$ | $N_{subframe}^{slots\mu}$ | $N_{symb}^\mu$ | $N_{frame}^{slots\mu}$ | $N_{subframe}^{slots\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots\mu}$ | $N_{subframe}^{slots\mu}$ | $N_{symb}^\mu$ | $N_{frame}^{slots\mu}$ | $N_{subframe}^{slots\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
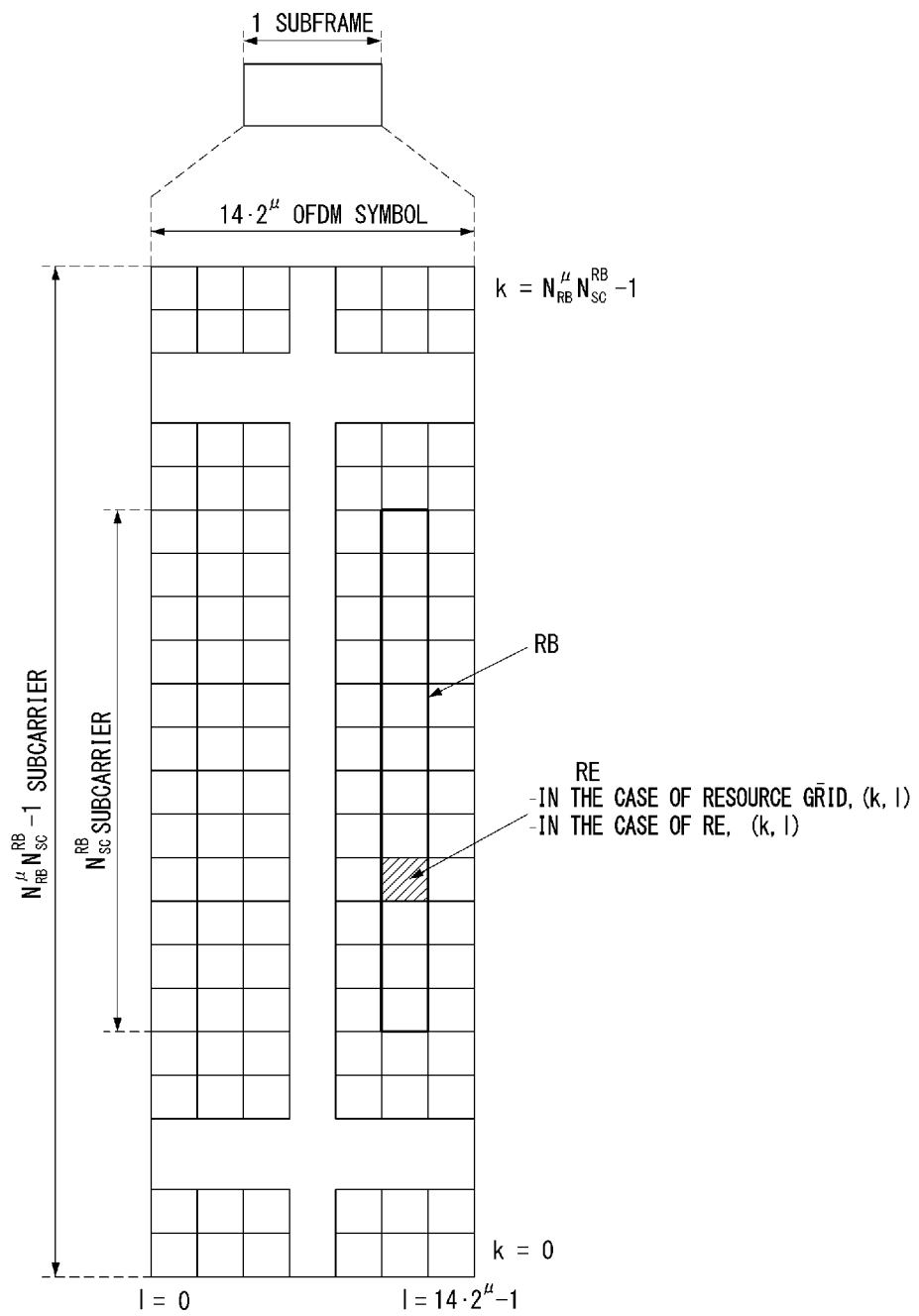
FIG. 3 illustrates an example of a resource grid supported in the wireless communication system to which the method proposed in the present specification may be applied.

FIG. 3 shows an example of a resource grid supported in a wireless communication system to which a method proposed in this specification may be applied.

FIG. 3 illustrates an example in which a resource grid includes $N_{RB}^{\mu} N_{sc}^{RB}$ subcarriers on the frequency domain and one subframe includes 14·2µ OFDM symbols, but the present invention is not limited thereto.

In the NR system, a transmitted signal is described by one or more resource grids including $N_{RB}^{\mu} N_{sc}^{RB}$ subcarriers and $2^{\mu} N_{symb}^{(\mu)}$ OFDM symbols. In this case, $N_{RB}^{\mu} \leq N_{RB}^{max,\mu}$. The $N_{RB}^{max,\mu}$ indicates a maximum transmission bandwidth, which may be different between numerologies and between uplink and downlink.

Figure 4:
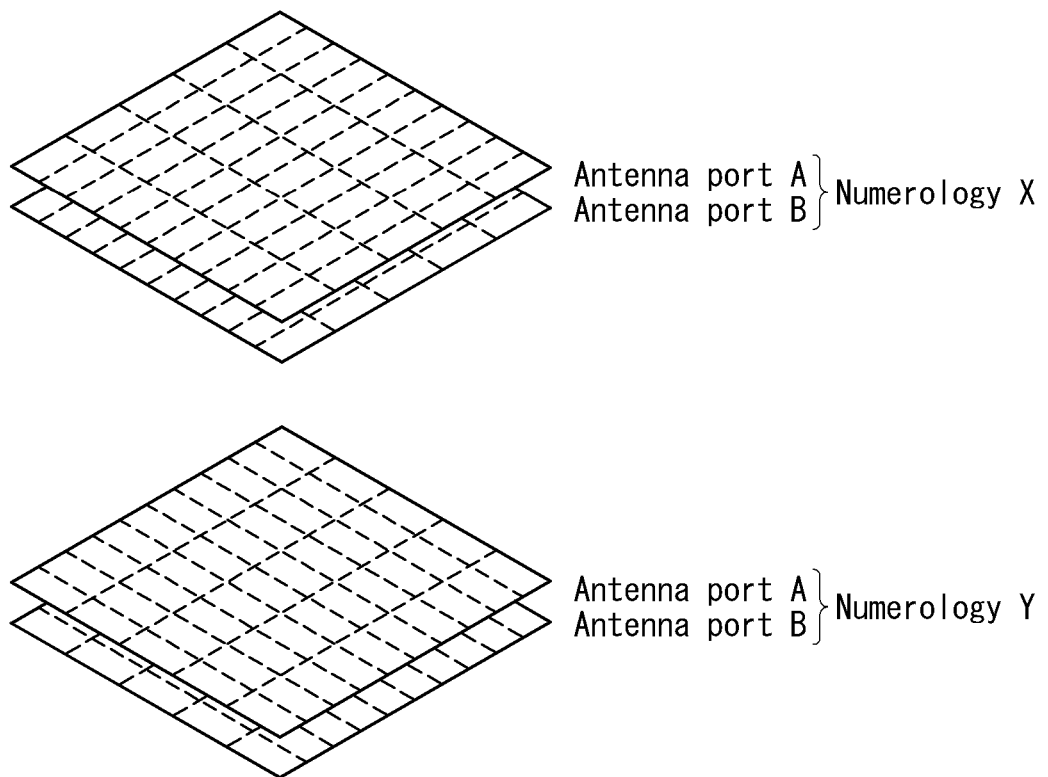
FIG. 4 shows examples of antenna ports and resource grids for each numerology to which a method proposed in this specification may be applied.

In this case, as in FIG. 4, one resource grid may be configured for each numerology $d^{\mu}$ and antenna port p.

FIG. 4 shows examples of antenna ports and resource grids for each numerology to which a method proposed in this specification may be applied.

Each element of the resource grid for the numerology µ and the antenna port p is indicated as a resource element, and may be uniquely identified by an index pair (k,Ī). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k, Ī) is used. Herein, $l=0, \ldots N_{symb}^{\mu}-1$.

The resource element (k,Ī) for the numerology µ and the antenna port p corresponds to a complex value $a_{k,\bar{l}}^{(p,\mu)}$. When there is no risk of confusion or when a specific antenna port or numerology is specified, the indexes p and µ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k, l) may be given as in Equation 1

[Equation 1]

$$n_{PRB} = \left\lfloor \frac{k}{N_{sc}^{RB}} \right\rfloor$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: a set of L1/L2 procedures for obtaining and maintaining a set of TRP(s) and/or UE beams which may be used for DL and UL transmission and reception, and includes at least the following contents:

Beam determination: an operation for a TRP(s) or a UE to select its own transmission/reception beam.

Beam measurement: an operation for a TRP(s) or a UE to measure the characteristics of a received beamforming signal.

Beam reporting: an operation for a UE to report information of a beamformed signal based on beam measurement.

Beam sweeping: an operation of covering a space region using beams transmitted and/or received at time intervals according to a predetermined method.

Furthermore, a Tx/Rx beam correspondence in a TRP and a UE is defined as follows.

A Tx/Rx beam correspondence in a TRP is maintained when at least one of the followings is satisfied.

A TRP may determine a TRP reception beam for uplink reception based on the downlink measurement of a UE for one or more Tx beams of the TRP.

A TRP may determine a TRP Tx beam for downlink transmission based on the uplink measurement of the TRP for one or more Rx beams of the TRP.

A Tx/Rx beam correspondence in a UE is maintained when at least one of the followings is satisfied.

A UE may determine a UE Tx beam for uplink transmission based on the downlink measurement of the UE for one or more Rx beams of the UE.

A UE may determine a UE Rx beam for downlink reception based on the indication of a TRP based on uplink measurement for one or more Tx beams.

Capability indication of UE beam correspondence-related information is supported by a TRP.

The following DL L1/L2 beam management procedure is supported within one or multiple TRPs.

P-1: it is used to enable UE measurement for a different TRP Tx beam in order to support the selection of a TRP Tx beam/UE Rx beam(s).

In the case of beamforming in a TRP, in general, intra/inter-TRP Tx beam sweep is included in a different beam set. For beamforming in a UE, it typically includes UE Rx beam sweep from a set of different beams.

P-2: UE measurement for a different TRP Tx beam is used to change an inter/intra-TRP Tx beam(s).

P-3: if a UE uses beamforming, UE measurement for the same TRP Tx beam is used to change a UE Rx beam.

Aperiodic reporting triggered by at least network is supported in the P-1, P-2 and P-3-related operations.

UE measurement based on an RS for beam management (at least CSI-RS) includes K (a total number of beams) beams. A UE reports the measurement results of selected N Tx beams. In this case, N is not essentially a fixed number. A procedure based on an RS for a mobility object is not excluded. Reporting information includes information indicating a measurement quantity for an N beam(s) when at least N<K and N DL transmission beams. In particular, a UE may report CSI-RS resource indicator (CRI) of N' with respect to K'>1 non-zero-power (NZP) CSI-RS resources.

The following higher layer parameters may be configured in a UE for beam management.

N≥1 reporting setting, M≥1 resource setting

Links between reporting setting and resource setting are established in an agreed CSI measurement configuration.

CSI-RS-based P-1 and P-2 are supported as resource and reporting setting.

P-3 may be supported regardless of whether reporting setting is present or not.

Reporting setting including at least the following contents.

Information indicating a selected beam

L1 measurement reporting

Time domain operation (e.g., an aperiodic operation, a periodic operation, a semi-persistent operation)

Frequency granularity when several frequency granularities are supported

Resource setting including at least the following contents

Time domain operation (e.g., an aperiodic operation, a periodic operation, a semi-persistent operation)

RS type: at least NZP CSI-RS

At least one CSI-RS resource set. Each CSI-RS resource set includes K>1 CSI-RS resources (some parameters of the K CSI-RS resources may be the same. For example, a port number, a time domain operation, density and a period)

Furthermore, NR supports the following beam reporting by taking into consideration L groups where L>1.

Information indicating a minimum group

Measurement quantity for an N1 beam (L1 RSRP and CSI reporting support (if a CSI-RS is for CSI acquisition))

Information indicating N1 DL transmission beams if applicable

Beam reporting based on a group, such as that described above, may be configured in a UE unit. Furthermore, the group-based beam reporting may be turned off in a UE unit (e.g., when L=1 or N1=1).

NR supports that a UE can trigger a mechanism for recovery from a beam failure.

A beam failure event occurs when quality of a beam pair link of an associated control channel is sufficiently low (e.g., a comparison with a threshold value, the timeout of an associated timer). A mechanism for recovery from a beam failure (or obstacle) is triggered when a beam obstacle occurs.

A network explicitly configures a UE having resources for transmitting an UL signal for a recovery object. The configuration of resources is supported at the place where a base station listens from some or all of directions (e.g., random access region).

An UL transmission/resource reporting a beam obstacle may be located at the same time instance as a PRACH (resource orthogonal to a PRACH resource) and at a time instance different from that of a PRACH (configurable with respect to a UE). The transmission of a DL signal is supported so that a UE can monitor a beam in order to identify new potential beams.

NR supports beam management regardless of a beam-related indication. If a beam-related indication is provided, information regarding a UE-side beamforming/reception procedure used for CSI-RS-based measurement may be indicated with respect to the UE through QCL. It is expected that parameters for delay, Doppler, an average gain, etc. used in the LTE system and a spatial parameter for beamforming in a reception stage will be added as QCL parameters to be supported in NR. An angle of arrival-related parameter may be included in the UE Rx beamforming viewpoint and/or angle of departure-related parameters may be included in the base station reception beamforming viewpoint. NR supports the use of the same or different beams in a control channel and corresponding data channel transmission.

For NR-PDCCH transmission supporting the robustness of beam pair link blocking, a UE may configure an NR-PDCCH on M beam pair links at the same time. In this case, a maximum value of M≥1 and M may depend on at least the UE capability.

A UE may be configured to monitor an NR-PDCCH on a different beam pair link(s) in different NR-PDCCH OFDM symbols. A parameter related to a UE Rx beam configuration for monitoring an NR-PDCCH on multiple beam pair links may be configured by higher layer signaling or a MAC CE and/or is taken into consideration in the search space design.

At least NR supports the indication of a spatial QCL assumption between a DL RS antenna port(s) and a DL RS antenna port(s) for the demodulation of a DL control channel. A candidate signaling method for the beam indication of an NR-PDCCH (i.e., a configuration method of monitoring an NR-PDCCH) is MAC CE signaling, RRC signaling, DCI signaling, spec. transparent and/or implicit method, and a combination of those signaling methods.

For the reception of a unicast DL data channel, NR supports the indication of a spatial QCL assumption between a DL RS antenna port and the DMRS antenna port of a DL data channel.

Information indicating an RS antenna port is indicated through DCI (downlink grant). Furthermore, the information indicates an RS antenna port QCLed with a DMRS antenna port. A different set of DMRS antenna ports for a DL data channel may be indicated as QCL with a different set of RS antenna ports.

Hereinafter, prior to detailed description of methods proposed in this specification, contents directly/indirectly related to the methods proposed in this specification are described in brief below.

In next-generation communication, such as 5G, New Rat (NR), as more communication devices require a greater communication capacity, there emerges a need for enhanced mobile broadband communication compared to the existing radio access technology (RAT).

Furthermore, massive machine type communications (MTC) providing various services anywhere and at any time by connecting multiple devices and things is also one of important issues to be taken into consideration in the next-generation communication.

Furthermore, the design or structure of a communication system in which services and/or UEs sensitive to reliability and latency are taken into consideration is also discussed.

As described above, the introduction of a next-generation radio access technology (RAT) in which enhanced mobile broadband (eMBB) communication, massive MTC (mMTC) and ultra-reliable and low latency communication (URLLC) are taken into consideration is now discussed. In this specification, a corresponding technology is commonly called "new RAT(NR)", for convenience sake.

Self-Contained Slot Structure

Figure 5:
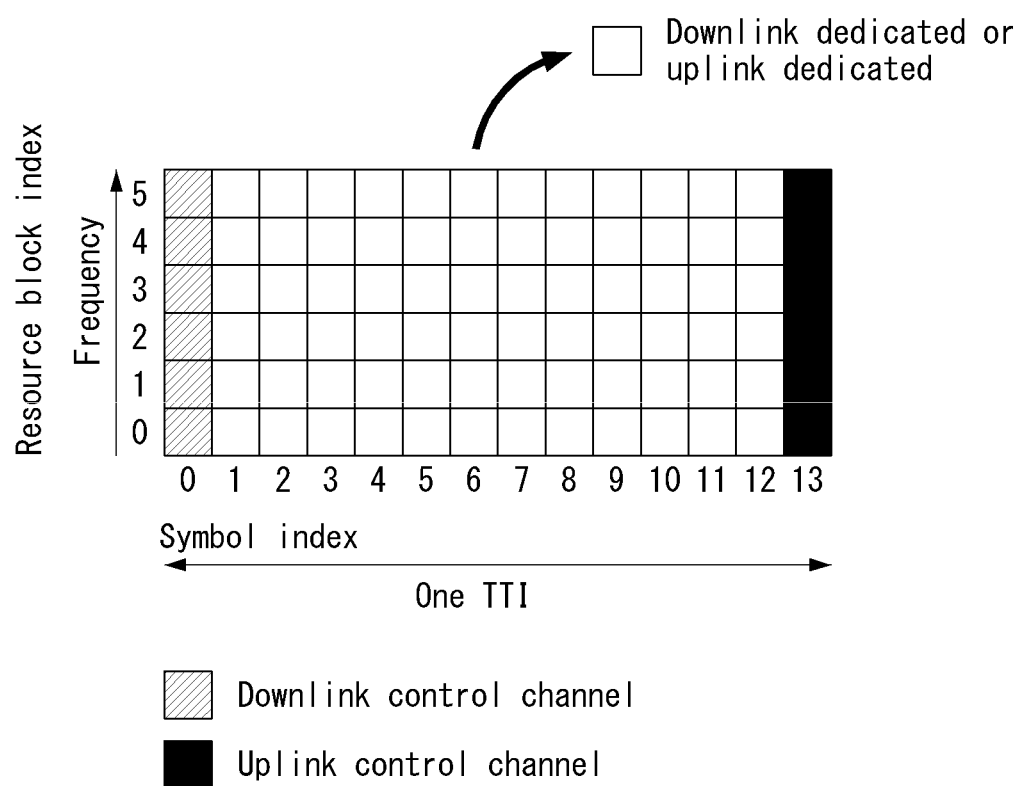
FIG. 5 is a diagram showing an example of a self-contained slot structure to which a method proposed in this specification may be applied.

In order to minimize latency of data transmission in the TDD system, a self-contained slot structure, such as FIG. 5, is taken into consideration in a 5-generation New RAT (NR).

That is, FIG. 5 is a diagram showing an example of a self-contained slot structure to which a method proposed in this specification may be applied.

In FIG. 5, a slashed region 510 indicates a downlink control region, and a black part 520 indicates an uplink control region.

A part 530 having no indication may be used for downlink data transmission and may be used for uplink data transmission.

The characteristics of such a structure is that DL transmission and UL transmission are sequentially performed within one slot and DL data is transmitted and UL Ack/Nack may also be transmitted and received within one slot.

Such a slot may be defined as a "self-contained slot."

That is, through such a slot structure, a base station can reduce the time taken for data retransmission to a UE when a data transmission error occurs, thereby being capable of minimizing latency of the final data delivery.

In such a self-contained slot structure, a base station and a UE require a time gap for a process from a transmission mode to a reception mode or a process from the reception mode to the transmission mode.

To this end, in the corresponding slot structure, some OFDM symbols at an instance from DL to UL is configured as a guard period (GP).

In the following specification, a method of configuring and/or indicating a physical resource block bundling size applied to a downlink shared channel (e.g., a physical downlink shared channel (PDSCH)) in relation to the transmission and reception of downlink data is described below specifically.

PRB bundling may mean an operation of applying the same PMI across a plurality of contiguous resource blocks (i.e., physical resource block (PRB)) when data transmission is performed. In other words, PRB bundling may mean that a UE assumes multiple resource blocks on the frequency domain as one granularity for precoding in order to perform PMI reporting and/or RI reporting.

Furthermore, PRB bundling for a downlink shared channel may mean or refer to demodulation reference signal bundling (DMRS bundling).

In this case, a system bandwidth or bandwidth part (BWP) may be split based on the size (e.g., P' or $P'_{BWP,i}$) of a precoding resource block group (PRG). Each PRG may include contiguous PRBs (or consecutive PRB). That is, a PRB bundling size described in this specification may mean the size of a PRB or a PRG value. Furthermore, a value (i.e., number) indicating a PRB bundling size may mean the number of PRBs for corresponding PRB bundling.

In this case, the setting of the size of PRB bundling needs to be determined by taking into consideration a tradeoff between the flexibility of precoders used in a PRB and quality of channel estimation. Specifically, if the size of PRB bundling is set very large, a disadvantage of a flexibility aspect may be caused depending on that the same precoder must be used in all PRBs. In contrast, if the size of PRB bundling is set very small, complexity in channel estimation may increase. Accordingly, to set the size of PRB bundling needs to be efficiently performed by taking into consideration the above-described aspects.

In relation to the transmission of downlink data, in the NR system, the value of a PRB bundling size may be set according to a method of selecting a specific value of preset values (e.g., 1, 2, 4, 8, 16) as the value of a PRB bundling size (hereinafter, a first method) and/or a method of setting the same value as bandwidth (or PRBs) contiguously scheduled (i.e., allocated) with respect to a corresponding UE on the frequency domain as the value of a PRB bundling size (hereinafter, a second method). In this case, the first method and the second method may be independently applied or the two methods may be mixed and applied.

For example, if a PRB bundling size set is configured as {2, 4, UE allocation band (e.g., wideband)}, a PRB bundling size may be selected (or determined) as any one value of 2 or 4 according to the first method. Alternatively, in this case, the PRB bundling size may be selected as a UE allocation band according to the second method.

In this case, if a PRB bundling size set includes a candidate value, such as {2, 4, UE allocation band (e.g., wideband)}, a PRB bundling size may be indicated through 1-bit information of a DCI field as follows.

For example, when the 1 bit of the DCI field indicates a value of "1", a PRB bundling size may be determined as one or two candidate values set by RRC.

In this case, if two candidate values are set by RRC, a PRB bundling size may be implicitly determined as one value based on a scheduled bandwidth, a resource block group, a subband size, a PDCCH resource element group bundling size, a bandwidth part, a DMRS pattern, etc.

When the 0 bit of a DCI field indicates a value of "0", a PRB bundling size may be set as a value set by RRC.

If a resource block group (RBG)=2 is configured in a UE, the UE does not expect the value of a PRG as "4."

In a wide range bandwidth, a set of RBG sizes may include at least values of 2, [3,] 4, [6,]8, 16. The RBG size may be different depending on the number of symbols for data.

An RBG size may be determined by a network channel bandwidth, a bandwidth for a configured bandwidth part, a network or downlink control information.

Resource allocation of uplink/downlink may be configured like Table 4 and may be selected by RRC.

TABLE 4

|  | Config 1 | Config 2 |
|---|---|---|
| X0 – X1 RBs | RBG size 1 | RBG size 2 |
| X1 + 1 – X2 RBs | RBG size 3 | RBG size 4 |
| ... | ... | ... |

RRC may select Config 1 or Config 2. One config may be configured as a default value when RRC configures another config.

A configuration for uplink/downlink is separate, but the same table may be used and the same RBG size may be used regardless of duration.

In relation to such contents, in the NR system, a method of indicating a PRB bundling size through a 1-bit value is taken into consideration. In this case, as described above, when an indicator indicating the bundling size of a DCI field is "0", one value set by RRC may be set as a bundling size.

However, when the value of an indicator indicating a bundling size in the DCI field is "1", two values has been set by RRC. In this case, a method of implicitly configuring a bundling size of the two values needs to be taken into consideration.

An embodiment of the present invention proposes an implicit determination method of dynamically indicating a bundling size when the value of an indicator indicating a bundling size is "1" by taking into consideration the above description.

The following embodiments have been classified for convenience of description only, and some elements or characteristics of any embodiment may be included in another embodiment or may be substituted with corresponding elements or characteristics of another embodiment.

For example, the contents of a PRB bundling size set described in the first embodiment may be applied to various embodiments of the specification in common.

Furthermore, for the configuration and/or indication of PRB bundling, methods described in the first embodiment to the fourth embodiment (e.g., a method for common downlink data) and a method described in a fifth embodiment (e.g., a method for broadcast downlink data) may be applied independently or in combination and vice versa.

<Embodiment 1> when a value of an indicator indicating a bundling size is "1", the bundling size may be determined based on the number of resource blocks allocated for a UE for PDSCH transmission.

Specifically, when the number of resource blocks allocated for PDSCH transmission is greater than a reference number (e.g., a specific threshold value), a greater value of candidate values included in the candidate value set of a bundling size configured by RRC may be set as a bundling size.

Alternatively, a bundling size may be implicitly configured by comparing a maximum value or minimum value of the number contiguously neighboring resources among resource blocks allocated to a UE for PDSCH transmission with a reference RB value (or threshold value) instead of the number of allocated resource blocks.

For example, if resource blocks allocated to a UE are (1,2,3), (6,7), and (10), a maximum value of the number of contiguously neighboring resources is 3 and a minimum value thereof is 1.

In this case, the UE may compare a maximum value or minimum value with a threshold value, and may set one of the candidate values of a bundling size, configured by RRC, as a bundling size based on a result of the comparison.

The "number of allocated resource blocks", a "maximum value or minimum value of the number of contiguously neighboring resource blocks among allocated resource blocks" and a "reference number (or threshold value)" may be separately set by a network through higher layer RRC signaling. A base station may indicate whether any of the number of allocated resource blocks, and a maximum value and minimum value of the number of contiguously neighboring resource blocks among allocated resource block will be set as a bundling size by comparing the values with a threshold value through RRC signaling with respect to a UE.

Embodiment 1-1

In the embodiment 1, a reference number (or threshold value) for determining a bundling size may be determined based on the bandwidth of an active bandwidth part, an active bandwidth part size or a bandwidth part size $N_{BWP,i}^{size}$.

For example, if 50 RBs are used in a carrier BWP 1, when an allocated resource is 10 RBs or more, a greater value of sets {2, 4}, {2, scheduled bandwidth (BW)}, and {4, scheduled bandwidth}, that is, a candidate value set of a bundling size configured by RRC is set (or determined) as a bundling size.

In this case, regardless of the number of RBs allocated for data transmission, a UE and a base station may assume the value of a scheduled bandwidth as a value greater than 2 or 4 and determine the bundling size.

If 100 RBs are used in a BWP 2, a threshold value may be changed differently from a BWP 1. When an allocated resource is 20 RBs or more, a greater value of a candidate value set of a bundling size may be set as a bundling size.

That is, a threshold value, that is, a reference RB number for determining a bundling size, may be a value obtained by dividing each of the bandwidth of an active bandwidth part, an active bandwidth part size or bandwidth part size $N_{BWP,i}^{size}$ by 2 as in Equation 2.

$$N_{BWP,i/2}^{size} \quad \text{[Equation 2]}$$

In Equation 2, the threshold value may be set as a rounding-up value, rounding-off value or half-rounding-up value of a value obtained by dividing each of the bandwidth of the active bandwidth part, an active bandwidth part size or a bandwidth part size, $N_{BWP,i}^{size}$ by 2.

If a bundling size is determined based on the number of allocated RBs, when the number of allocated RBs is small, a diversity effect can be obtained by performing precoder cycling through a small bundling size.

A threshold value, that is, the number of RBs that is a reference, may be determined based on a system bandwidth, the bandwidth of a component carrier or a UE-specific bandwidth.

Alternatively, if multiple active BWPs of BWPs configured for a UE neighbor contiguously or discontiguously, a threshold value may be determined based on a total number, minimum value or maximum value of BWs of each active BWP when a PDSCH is transmitted through one DCI configuration in multiple activated BWPs.

For example, if 10 RBs are used in an active BWP 1 and 20 RBs are used in an active BWP 2, a threshold value may be determined based on 30 RBs, that is, a total number, 10 RBs, that is, a minimum value, or 20 RBs, that is, a maximum value, of the BW.

Embodiment 1-2

Unlike in the embodiment 1-1, a threshold value may be determined based on an RBG size. For example, if an RBG size is {1, 2, 4}, when an allocated resource is 10 RBs or more, a greater value of sets {2, 4}, {2, scheduled bandwidth (BW)} and {4, scheduled bandwidth}, that is, a candidate value set of a bundling size, is set (or determined) as a bundling size.

However, if an RBG size is {8, 16}, when a threshold value is changed and thus an allocated resource is 20 RBs or more, a greater value of sets {2, 4}, {2, scheduled bandwidth (BW)} and {4, scheduled bandwidth}, that is, a candidate value set of a bundling size, may be set (or determined) as a bundling size.

If the method described in the proposal 1-1, 1-2 is used, when the number of allocated RBs is small, a diversity effect can be obtained by performing precoder cycling through a smaller bundling size.

That is, if the bundling size of a PRB is flexibly set, the size of bundling can be set based on a value of an indicator indicating the bundling size of a DCI field in the proposals 1 to 1-2.

In this case, a UE may obtain candidate value sets, including candidate values of a bundling size, through RRC signaling from a base station.

Specifically, when a value of DCI is "0", a UE may select a candidate value set including a candidate value of the sets of candidate values when it receives a PDSCH scheduled by the same DCI, and may set the value, included in the selected candidate value set, as a bundling size.

When the value of DCI is "1", the UE selects a candidate value set including one or more candidate values among the sets of candidate values when it receives a PDSCH scheduled by the same DCI.

If one or more values are included in the selected candidate value set, the UE may select one of two values and set the selected value as the size of bundling.

In this case, to select one of the two values may be implicitly indicated with respect to the UE.

Specifically, when the number of contiguous PRBs is greater than the above-described threshold value, the UE may set a greater value of values included in a candidate value set as a bundling size. If not, the UE may set a smaller value as a bundling size.

For example, if a candidate value set is {2, wideband} or {4, wideband}, a UE may set a wideband value as a bundling size when the number of contiguously contiguous PRBs is greater than a threshold value, and may set 2 or 4 as a bundling size if not.

<Proposal 2>

When a value of an indicator indicating a bundling size is "1", the bundling size may be implicitly determined based on a resource allocation type configured in a UE.

Specifically, in LTE, the allocation of downlink resources may be differently configured based on the type. That is, a resource allocation type for the configuration of a downlink resource may be defined as 0, 1 or 2.

In the resource allocation type 0, resources are allocated in an RBG unit based on a BWP. In the resource allocation type 1, resources are allocated by notifying a UE of RBs in which downlink transmission occurs within a subset including contiguous RBGs according to a BWP through a bitmap. In the resource allocation type 2, contiguous RB resources are allocated by notifying a UE of an RB number and length where resource allocation starts. The resource allocation type 2 may be divided into localized transmission and distributed transmission.

In the case of the localized transmission of the resource allocation type 2, contiguous RB resources are allocated to a UE without any change. In the case of the distributed transmission of the resource allocation type 2, RBs are uniformly distributed to the frequency domain based on a gap size according to a BWP and allocated to a UE.

In NR downlink, localized resource allocation of the resource allocation type 0 and 2 in LTE can be supported. Distributed resource allocation of the type 2 can also be supported. Accordingly, a bundling size may be implicitly configured based on a resource allocation type allocated to a UE.

<Proposal 2-1>

In the resource allocation type 0 described in the proposal 2, if a candidate value set of a bundling size configured by RRC is {2,4} and {2, scheduled BW}, when an RBG size is {1, 2}, a bundling size is set as a smaller value. When the RBG size is {4, 8, 16}, a bundling size is set as a greater value.

Furthermore, if a candidate value set is {4, scheduled BW}, a bundling size is set as a smaller value when the size of an RBG is {1, 2, 4}, and a bundling size is set as a greater value when the RBG size is {8, 16}.

In this case, if the size of contiguously allocated RBGs is great, high channel estimation performance can be obtained using a large number of DMRS symbols neighboring in the frequency domain.

The proposal 2-1 is a method for configuring a bundling size when a resource allocation type is "0", but is not limited thereto. The proposal 2-1 may also be applied to a method for configuring a bundling size regardless of a resource allocation type.

An active BWP may be flexibly changed through MAC signaling. The RBG of a UE (determined as the size of an active BWP) may be flexibly changed. As a result, a bundling size may be flexibly changed.

<Proposal 2-2>

If a resource allocation type is the type 2 and distributed transmission is configured as DCI, a smaller value is set as a bundling size in each of candidate value sets {2,4}, {2, scheduled BW}, and {4, scheduled BW} configured by RRC.

The distributed transmission of the resource allocation type 2 is a method of allocating discontiguous RB resources uniformly distributed in the frequency domain based on a BWP. Accordingly, to set a bundling size greatly may be meaningless because the possibility that a coherent frequency will be broken for each allocated RB is good.

In the resource allocation type 2, if the distributed transmission is configured, a UE may neglect an indicator (field value) indicating a bundling size in DCI, and may assume the smallest value in a candidate value set as a bundling size or not apply bundling.

That is, the UE may make off PRB bundling so that a different precoder is applied for each RB.

<Proposal 2-3>

If a resource allocation type is the type 2 and the localized transmission is configured as DCI, a greater value in each of candidate value sets {2,4}, {2, scheduled BW}, and {4, scheduled BW} configured by RRC is set as a bundling size.

In this case, high channel estimation performance can be obtained as in the proposal 2-1 using a large number of DMRS symbols neighboring in the frequency domain from contiguously allocated RBs.

Alternatively, a method of setting a bundling size using the method of the proposal 1 in the case of the localized transmission of the resource allocation type 2 and determining a bundling size according to the resource allocation type described in the proposal 2 in the remaining resource allocation types may be used.

<Proposal 3>

Unlike in the proposal 1 and the proposal 2, if an indicator related to the bundling size of DCI has a value of "1", a bundling size may be set based on the number of layers among multiple antenna information configured in a UE through the DCI.

For example, if the number of layers configured through DCI is 2 or less, a greater value in each of {2,4}, {2, scheduled BW}, and {4, scheduled BW}, that is, candidate value sets configured by RRC, may be set as a bundling size.

If the number of layers configured by DCI is 3 or more, a smaller value in each of candidate value sets may be set as a bundling size.

When the SNR is fixed, to increase the number of layers means an increase in the number of independent transmission and reception paths. Accordingly, a total number of transmission and reception paths may also increase.

If the transmission and reception path increases, frequency selectivity of a transmission and reception channel may increase due to an increase in delay spread.

If frequency selectivity of a channel is great, a frequency selective gain can be obtained through a small bundling size.

<Proposal 4>

When an indicator related to the bundling size of DCI has a value of "1", a UE scheduled with multi user (MU)-MIMO sets a smaller value in each of candidate value sets {2,4}, {2, scheduled BW}, and {4, scheduled BW}, configured by RRC, as a bundling size.

If an RB allocated with SU and an RB allocated with MU-MIMO, among RBs allocated to a UE, coexist, a large bundling size may become an obstacle in applying an efficient precoder to each RB.

For example, if a scheduled BW is 10 RBs, an RB allocated with MU-MIMO is 1 RB, and an RB allocated with SU is 9 RBs, when a bundling size is set as 10 RBs, that is, a scheduled BW, and a Zero-Forcing precoder is fully used in a BW scheduled for the 1 RB allocated with MU-MIMO, beamforming not necessary for 9 RBs allocated with SU may be performed.

In this case, if a small bundling size, such as 2 or 4, is set, the number of RBs on which beamforming is unnecessarily performed can be reduced.

A UE receives DMRS port information of another UE, co-schedule with MU-MIMO, or DMRS CDM group information multiplexed using a CDM method through DCI from a base station.

A UE may recognize (or determine) whether the UE is scheduled with MU-MIMO through received DCI. Accordingly, the UE may determine a bundling size using the method described in the proposal 4.

Alternatively, a UE may determine whether MU-MIMO is applied based on a specific port of a DMRS symbol or whether a CDM group is rate-matched.

Furthermore, a UE may determine a bundling size based on whether MU-MIMO is applied and a total number of layers of another MU-paired UE or the ratio of the number of layers allocated thereto and a total number of layers allocated to another UE.

Alternatively, a UE may determine a bundling size based on whether the number of ports in which rate matching has been indicated or the number of CDM groups is a given value (threshold value) or more (or exceeds the given value) in a DMRS symbol, or may determine a bundling size based on the ratio of the number of DMRS ports allocated thereto or the number of REs and the number of ports in which rate matching has been indicated or the number of REs is a given value or more (or exceeds the given value).

In this case, the bundling size may be determined when the value of an indicator indicating a bundling size of DCI is "1" through two or more of the above-described methods.

For example, in the methods of the proposals 1 to 3, in a specific case, a bundling size is determined through the method of the proposal 4, but the method of the proposal 4 may be performed with priority over the methods of the proposal 1 to the proposal 3.

In another embodiment of the present invention, if a candidate value set includes 3 values, a threshold value in the proposals 1 to 3 may be set as 2 values, and a bundling size may be determined. In this case, in the proposal 4, a UE scheduled with MU-MIMO may set the smallest value of the 3 candidate values as a bundling size.

In the proposals 1 to 4, a threshold value, that is, a reference RB, may be determined based on an RBG size or a subband size (used for CSI calculation) may be used instead of an RBG in the method of determining a PRG based on an RBG size.

That is, a threshold value, that is, a reference RB, may be determined or a PRG may be determined based on a sub-band size.

In this case, RBG values may be properly substituted with sub-band values because a candidate value of an RBG and a candidate value of a sub-band are different.

Both an RBG value and a sub-band value are determined as the BW of an active BWP. Accordingly, when an RBG value is substituted with a sub-band value, the BW of a BWP corresponding to the RBG value may be calculated and may be substituted with a sub-band value determined based on the corresponding BW.

<Proposal 5>

If the distributed transmission of the resource allocation type 1 is set through scheduling DCI, contiguous virtual resource blocks (VRB) are interleaved in an RB pair unit and distributed to the PRB domain.

Thereafter, RBs are disposed at a regulated gap size interval for each BW size of an active BWP within an RB pair.

If VRBs are distributed, a pattern or interleaving method of distributing the VRBs may be performed according to various methods.

In this case, a method of implicitly determining a bundling size may be different based on a unit of interleaving.

First, if a VRB is interleaved in an RB unit, a smaller value in a candidate value set configured by RRC may be set as a bundling size. For example, if candidate value sets are {2,4} and {2, scheduled BW}, a bundling size may be determined to be "2." If a candidate value set is {4, scheduled BW}, a bundling size may be determined to be "4."

If the number of RBs allocated for a UE increases, there is a good possibility that allocated VRBs may neighbor in the PRB domain although they experience interleaving. Accordingly, a bundling size of a minimum 2 or 4 may use the number of DMRS symbols greater than that when a bundling size is "1" in a neighbor RB. In this case, channel estimation performance can be improved.

If a candidate value set is {4, scheduled BW}, if to select "4", that is, a smaller value, as a bundling size is determined to be inefficient, a network may set a bundling size to "2" by setting an indicator (or field) indicating the bundling size of DCI to "0."

Alternatively, in the distributed resource allocation type 1 (distributed RA type 1), if a VRB is interleaved in an RB unit, a bundling size may always be set to 2.

Second, if a VRB is interleaved in an RBG unit, a PRG size may be set as a configured RBG size because the PRG size of a minimum RBG unit needs to be taken into consideration in order to improve channel estimation performance.

Alternatively, if the number of RBGs allocated to a specific UE is many although interleaving is performed in an RBG unit, there is a possibility that the allocated RBGs may neighbor.

Accordingly, a threshold value may be set in the number of RBGs substantially allocated to a UE based on the size of an active BWP BW or an interleaving method. When the number of allocated RBGs exceeds the threshold value, a PRG size may be set like Equation 3.

[Equation 3]

PRG size=(N×set RBG size)

In Equation 3, N may have a value of "2."

When the number of allocated RBGs does not exceeds the threshold value, a PRG size may be set as a configured RBG size.

Alternatively, as in the proposal 2-1, the PRG size may be implicitly determined based on the RBG size.

In another embodiment of the present invention, if the distributed resource allocation type 1 is configured through scheduling DCI and a VRB is interleaved as a PRB in an RB unit, as described above, when the number of RBs allocated for the data transmission of a UE increases, the probability that the RBs may actually neighbor in the PRB domain increases although the corresponding RBs are interleaved through an interleaver.

In this case, a threshold value may be set in the number of allocated RBs based on the size of an active BWP BW or an interleaving method.

If the number of allocated RBs exceeds the threshold value, when an indicator (or 1-bit field) for indicating the bundling size of DCI is "1", a smaller value in a candidate value set configured by RRC is determined as a bundling size.

However, if the number of allocated RBs does not exceed the threshold value, a bundling size may be set to "1" exceptionally.

In this case, if PRG=1 is included in a candidate value, a bundling size may be set to "1."

Alternatively, bundling may be made off and may not be performed regardless of a value of an indicator (or 1-bit field) for indicating a bundling size (i.e., PRG=1 RB).

<Proposal 6>

In the proposal 1 to the proposal 6, in the candidate value sets {2, scheduled BW} and {4, scheduled BW} configured by RRC for the indicator (or 1-bit field) for indicating the bundling size of DCI, when the number of RBs allocated for data transmission, that is, a scheduled BW, is smaller than 2 or 4, a UE and a base station may assume a scheduled BW to be smaller than 2 or 4 and set a bundling size using the methods of the proposal 1 to the proposal 5.

Figure 6:
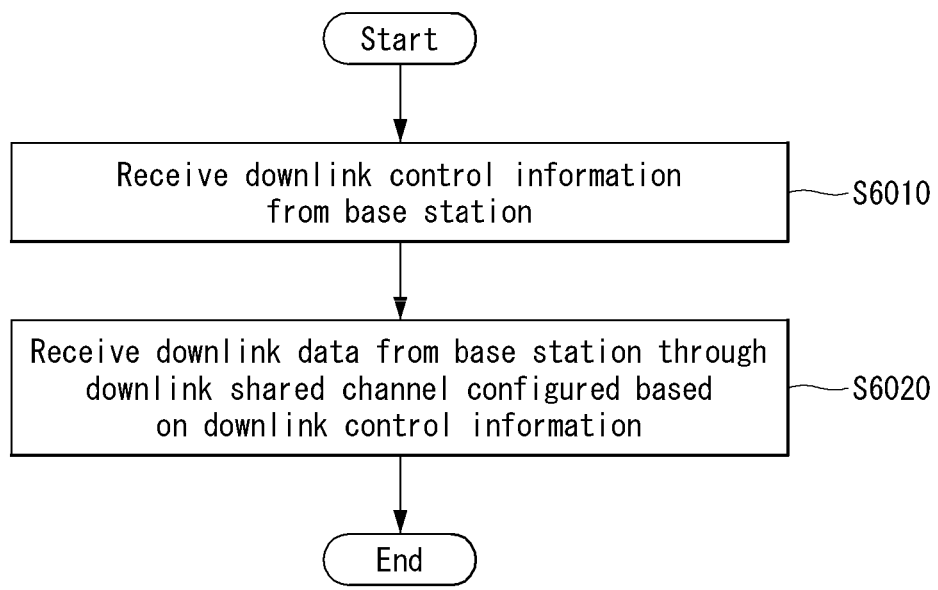
FIG. 6 shows an operational flowchart of a UE which transmits and receives data in a wireless communication system to which a method proposed in this specification may be applied.

FIG. 6 shows an operational flowchart of a UE which transmits and receives data in a wireless communication system to which a method proposed in this specification may be applied. FIG. 6 is merely for convenience of description and does not restrict the range of the present invention.

Referring to FIG. 6, a corresponding UE may perform the method(s) in the embodiments of this specification. In particular, a corresponding UE may support the methods described in the proposal 1 to the proposal 6. In FIG. 6, related detailed description overlapping the above-described contents is omitted.

First, the UE may receive downlink control information (DCI) from a base station (S6010).

In this case, the DCI may include the indicator (or 1-bit field) for indicating a bundling size, described in the proposals 1 to 6.

Thereafter, the UE may receive downlink data from the base station through a downlink shared channel configured based on the downlink control information (S6020).

In this case, the bundling size of the downlink shared channel may be set as a specific number of physical resource blocks or the size of a frequency resource region allocated to the UE. In this case, a value indicating the specific number of physical resource blocks may be included in a candidate value set previously configured for the downlink shared channel.

The candidate value set may be obtained through RRC signaling, and each candidate value set may include the candidate values described in the proposals 1 to 6.

The bundling size may be implicitly configured through the methods described in the proposals 1 to 6 based on a value of the indicator or the 1-bit field.

For example, as described in the proposal 1, when a value of the indicator or the 1-bit field is "0", a bundling size may be set as a value set by RRC.

However, when a value of the indicator or the 1-bit field is "1", a bundling size may be determined based on a result of a comparison between the number of contiguous PRBs and a threshold value.

Specifically, when the number of contiguous PRBs is greater than a threshold value, a greater value of values included in a candidate value set may be set as a bundling size. If not, the remaining value may be set as a bundling size.

In this case, the threshold value may be a value obtained by dividing the number of resource blocks of a bandwidth for an active bandwidth part (BWP) by 2, as described in the proposal 1.

As shown in FIGS. 8 to 11, the UE may include a processor, an RF unit and memory. The processor may control the RF unit to receive downlink control information (DCI) from the base station and to receive downlink data from the base station through a downlink shared channel configured based on the downlink control information.

In this case, the DCI may include the indicator (or 1-bit field) for indicating a bundling size, described in the proposals 1 to 6.

The bundling size of the downlink shared channel may be set as a specific number of physical resource blocks or the size of a frequency resource region allocated to the UE. In this case, a value indicating the specific number of physical resource block may be included in a candidate value set previously configured through the downlink shared channel.

The candidate value set may be obtained through RRC signaling, and each candidate value set may include the candidate values described in the proposals 1 to 6.

The bundling size may be implicitly configured through the methods described in the proposals 1 to 6 based on a value of the indicator or the 1-bit field.

For example, as described in the proposal 1, when a value of the indicator or the 1-bit field is "0", a bundling size may be set based on a value set by RRC.

However, when a value of the indicator or the 1-bit field is "1", a bundling size may be determined based on a result of a comparison between the number of contiguous PRBs and a threshold value.

Specifically, when the number of contiguous PRBs is greater than a threshold value, a greater value of values included in a candidate value set may be set as a bundling size. If not, the remaining value may be set as a bundling size.

In this case, the threshold value may be a value obtained by dividing the number of resource blocks of a bandwidth for an active bandwidth part (BWP) by 2, as described in the proposal 1.

Figure 7:
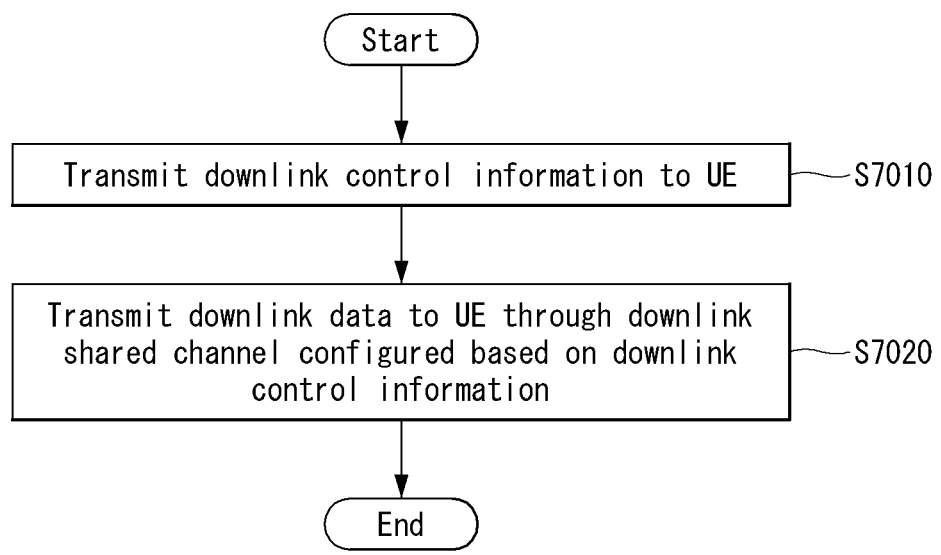
FIG. 7 shows an operational flowchart of a base station which transmits and receives data in a wireless communication system to which a method proposed in this specification may be applied.

FIG. 7 shows an operational flowchart of a base station which transmits and receives data in a wireless communication system to which a method proposed in this specification may be applied.

FIG. 7 is merely for convenience of description and does not restrict the range of the present invention.

Referring to FIG. 7, a corresponding base station may perform the method(s) described in the embodiments of this specification. In particular, a corresponding base station may support the methods described in the proposal 1 to the proposal 6. In FIG. 7, related detailed description overlapping the above-described contents is omitted.

First, a base station may transmit downlink control information (DCI) to a UE (S7010).

In this case, the DCI may include the indicator (or 1-bit field) for indicating a bundling size, described in the proposals 1 to 6.

Thereafter, the base station may transmit downlink data to the UE through a downlink shared channel configured based on the downlink control information (DCI) (S7020).

In this case, the DCI may include the indicator (or 1-bit field) for indicating a bundling size, described in the proposals 1 to 6.

The bundling size of the downlink shared channel may be set as a specific number of physical resource blocks or the size of a frequency resource region allocated to the UE. In this case, a value indicating the specific number of physical resource blocks may be included in a candidate value set previously configured for the downlink shared channel.

The candidate value set may be obtained through RRC signaling, and each candidate value set may include the candidate values described in the proposals 1 to 6.

The bundling size may be implicitly configured through the methods described in the proposals 1 to 6 based on a value of the indicator or the 1-bit field.

For example, as described in the proposal 1, when a value of the indicator or the 1-bit field is "0", a bundling size may be set as a value set by RRC.

However, when a value of the indicator or the 1-bit field is "1", a bundling size may be determined based on a result of a comparison between the number of contiguous PRBs and a threshold value.

Specifically, when the number of contiguous PRBs is greater than a threshold value, a greater value of values included in a candidate value set may be set as a bundling size. If not, the remaining value may be set as a bundling size.

In this case, the threshold value may be a value obtained by dividing the number of resource blocks of a bandwidth for an active bandwidth part (BWP) by 2, as described in the proposal 1.

The base station may include a processor, an RF unit and memory, as shown in FIGS. 8 to 11. The processor may control the RF unit to transmit downlink control information (DCI) to a UE and to transmit downlink data to the UE through a downlink shared channel configured based on the downlink control information.

In this case, the DCI may include the indicator (or 1-bit field) for indicating a bundling size, described in the proposals 1 to 6.

The bundling size of the downlink shared channel may be set as a specific number of physical resource blocks or the size of a frequency resource region allocated to the UE. In this case, a value indicating the specific number of physical resource block may be included in a candidate value set previously configured through the downlink shared channel.

The candidate value set may be obtained through RRC signaling, and each candidate value set may include the candidate values described in the proposals 1 to 6.

The bundling size may be implicitly configured through the methods described in the proposals 1 to 6 based on a value of the indicator or the 1-bit field.

For example, as described in the proposal 1, when a value of the indicator or the 1-bit field is "0", a bundling size may be set based on a value set by RRC.

However, when a value of the indicator or the 1-bit field is "1", a bundling size may be determined based on a result of a comparison between the number of contiguous PRBs and a threshold value.

Specifically, when the number of contiguous PRBs is greater than a threshold value, a greater value of values included in a candidate value set may be set as a bundling size. If not, the remaining value may be set as a bundling size.

In this case, the threshold value may be a value obtained by dividing the number of resource blocks of a bandwidth for an active bandwidth part (BWP) by 2, as described in the proposal 1.

General Apparatus to which the Present Invention May be Applied

Figure 8:
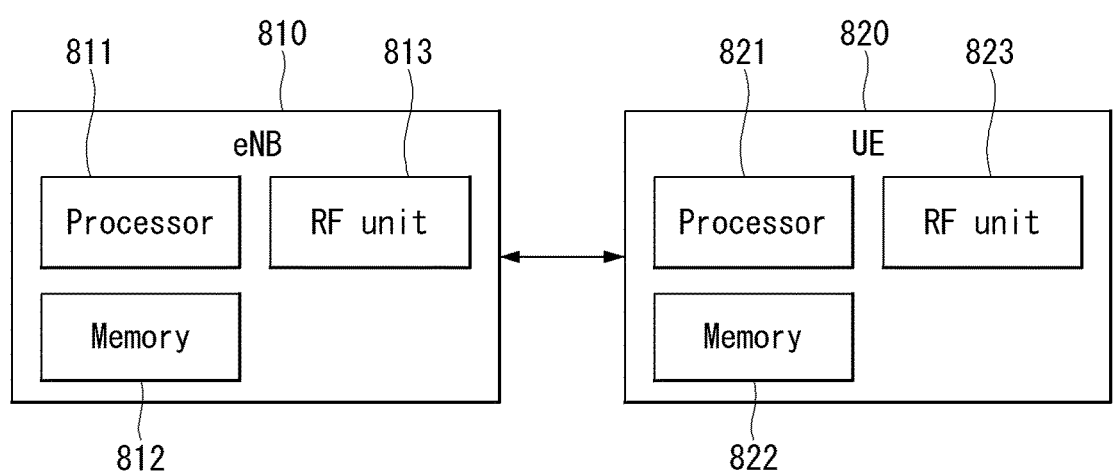
FIG. 8 illustrates a block diagram of a wireless communication apparatus according to an embodiment of the present invention.

FIG. 8 illustrates a block diagram of a wireless communication apparatus according to an embodiment of the present invention.

Referring to FIG. 8, the wireless communication system includes an eNB (or network) 810 and a UE 820.

The eNB 810 includes a processor 811, memory 812 and a communication module 813.

The processor 811 implements the functions, processes and/or methods proposed in FIGS. 1 to 7. The layers of a wired/wireless radio interface protocol may be implemented by the processor 811. The memory 812 is connected to the processor 811 and stores various types of information for driving the processor 811. The communication module 813 is connected to the processor 811 and transmits and/or receives wired/wireless signals.

The communication module 813 may include a radio frequency (RF) unit for transmitting and receiving radio signals.

The UE 820 includes a processor 821, memory 822 and a communication module (or RF unit) 823. The processor 821 implements the functions, processes and/or methods proposed in FIGS. 1 to 7. The layers of a radio interface protocol may be implemented by the processor 821. The memory 822 is connected to the processor 821 and stores various types of information for driving the processor 821. The communication module 823 is connected to the processor 821 and transmits and/or receives radio signals.

The memory 812, 822 may be positioned inside or outside the processor 811, 821 and may be connected to the processor 811, 821 by well-known means.

Furthermore, the eNB 810 and/or the UE 820 may have a single antenna or multiple antennas.

Figure 9:
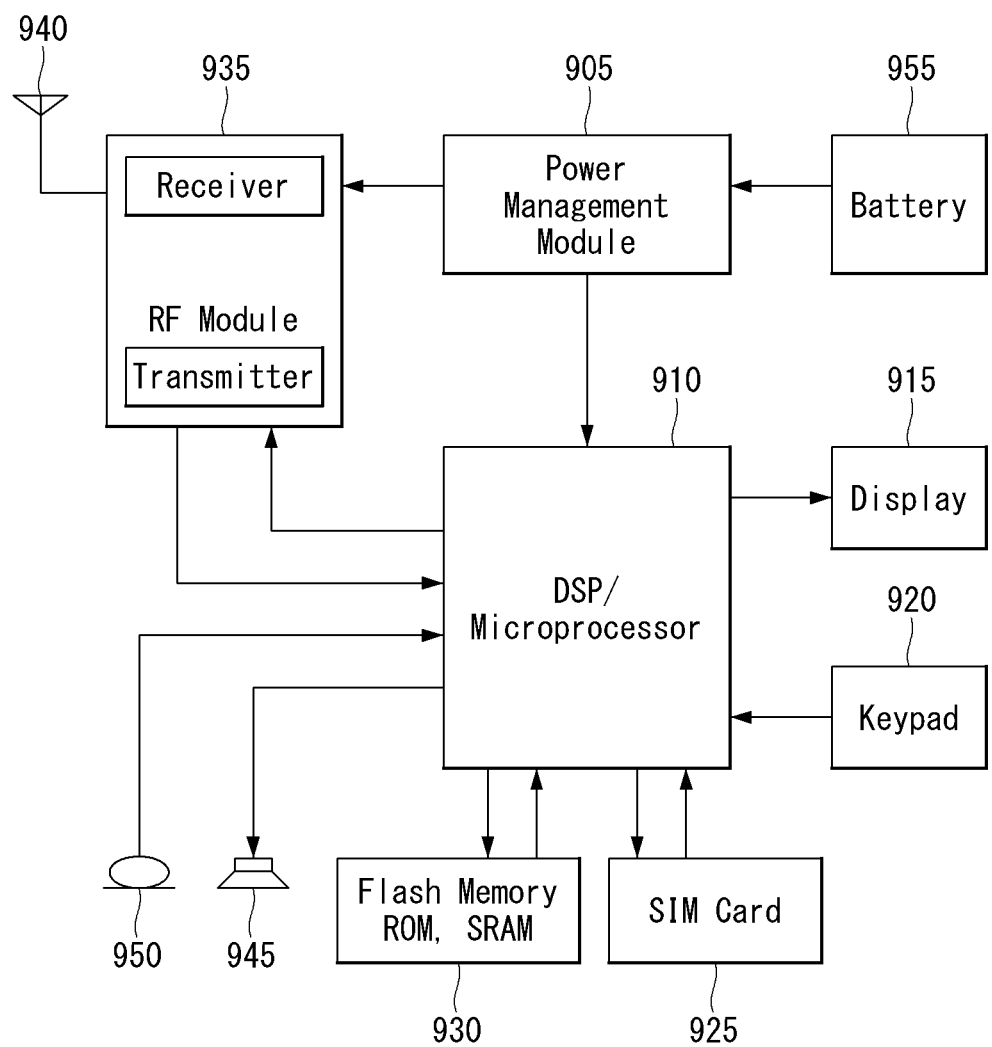
FIG. 9 illustrates a block diagram of a communication apparatus according to an embodiment of the present invention.

FIG. 9 illustrates a block diagram of a communication apparatus according to an embodiment of the present invention.

In particular, FIG. 9 is a diagram illustrating the UE of FIG. 8 more specifically.

Referring to FIG. 9, the UE may include a processor (or digital signal processor (DSP) 910, an RF module (or the RF unit) 935, a power management module 905, an antenna 940, a battery 955, a display 915, a keypad 920, memory 930, a subscriber identification module (SIM) card 925 (this element is optional), a speaker 945 and a microphone 950. The UE may further include a single antenna or multiple antennas.

The processor 910 implements the functions, processes and/or methods proposed in FIGS. 1 to 7. The layers of a radio interface protocol may be implemented by the processor.

The memory 930 is connected to the processor and stores information related to an operation of the processor. The memory may be positioned inside or outside the processor and may be connected to the processor by various well-known means.

A user inputs command information, such as a telephone number, by pressing (or touching) a button of the keypad 920 or through voice activation using the microphone 950, for example. The processor receives such command information and performs processing so that a proper function, such as making a phone call to the telephone number, is performed. Operational data may be extracted from the SIM card 925 or the memory. Furthermore, the processor may recognize and display command information or driving information on the display 915, for convenience sake.

The RF module 935 is connected to the processor and transmits and/or receives RF signals. The processor delivers command information to the RF module so that the RF module transmits a radio signal that forms voice communication data, for example, in order to initiate communication. The RF module includes a receiver and a transmitter in order to receive and transmit radio signals. The antenna 940 functions to transmit and receive radio signals. When a radio signal is received, the RF module delivers the radio signal so that it is processed by the processor, and may convert the signal into a baseband. The processed signal may be converted into audible or readable information output through the speaker 945.

Figure 10:
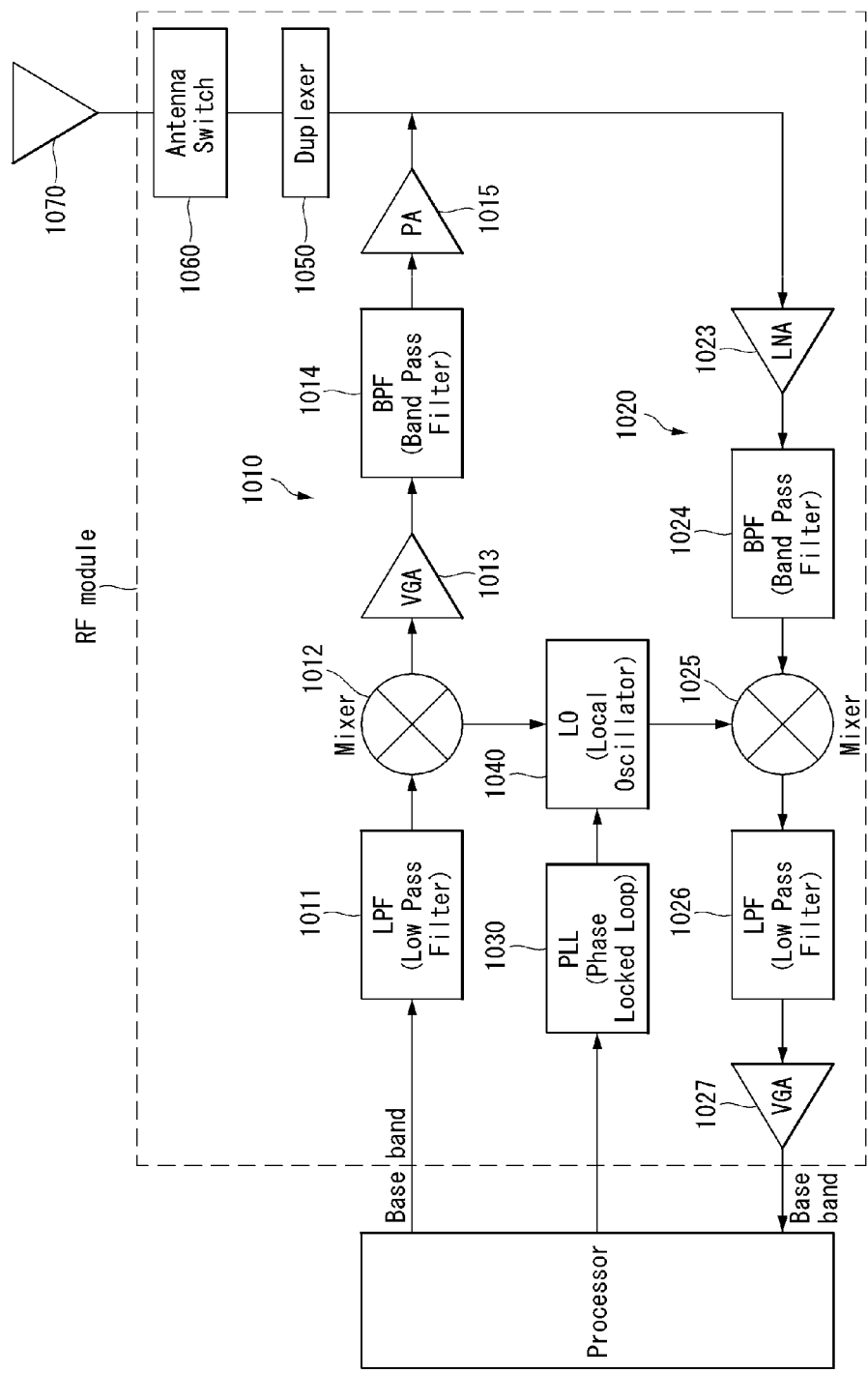
FIG. 10 is a diagram showing an example of the RF module of a wireless communication apparatus to which a method proposed in this specification may be applied.

FIG. 10 is a diagram showing an example of the RF module of the wireless communication apparatus to which a method proposed in this specification may be applied.

Specifically, FIG. 10 shows an example of an RF module that may be implemented in a frequency division duplex (FDD) system.

First, in a transmission path, the processor described in FIGS. 8 and 9 processes data to be transmitted and provides an analog output signal to a transmitter 1010.

In the transmitter 1010, the analog output signal is filtered by a low pass filter (LPF) 1011 in order to remove images caused by digital-to-analog conversion (ADC). The signal is up-converted from a baseband to an RF by a mixer 1012 and is amplified by a variable gain amplifier (VGA) 1013. The amplified signal is filtered by a filter 1014, additionally amplified by a power amplifier (PA) 1015, routed by a duplexer(s) 1050/antenna switch(es) 1060, and transmitted through an antenna 1070.

Furthermore, in a reception path, the antenna 1070 receives signals from the outside and provides the received signals. The signals are routed by the antenna switch(es) 1060/duplexers 1050 and provided to a receiver 1020.

In the receiver 1020, the received signals are amplified by a low noise amplifier (LNA) 1023, filtered by a band pass filter 1024, and down-converted from the RF to the baseband by a mixer 1025.

The down-converted signal is filtered by a low pass filter (LPF) 1026 and amplified by a VGA 1027, thereby obtaining the analog input signal. The analog input signal is provided to the processor described in FIGS. 8 and 9.

Furthermore, a local oscillator (LO) 1040 generates transmission and reception LO signals and provides them to the mixer 1012 and the mixer 1025, respectively.

Furthermore, a phase locked loop (PLL) 1030 receives control information from the processor in order to generate transmission and reception LO signals in proper frequencies, and provides control signals to the local oscillator 1040.

Furthermore, the circuits shown in FIG. 10 may be arrayed differently from the configuration shown in FIG. 10.

Figure 11:
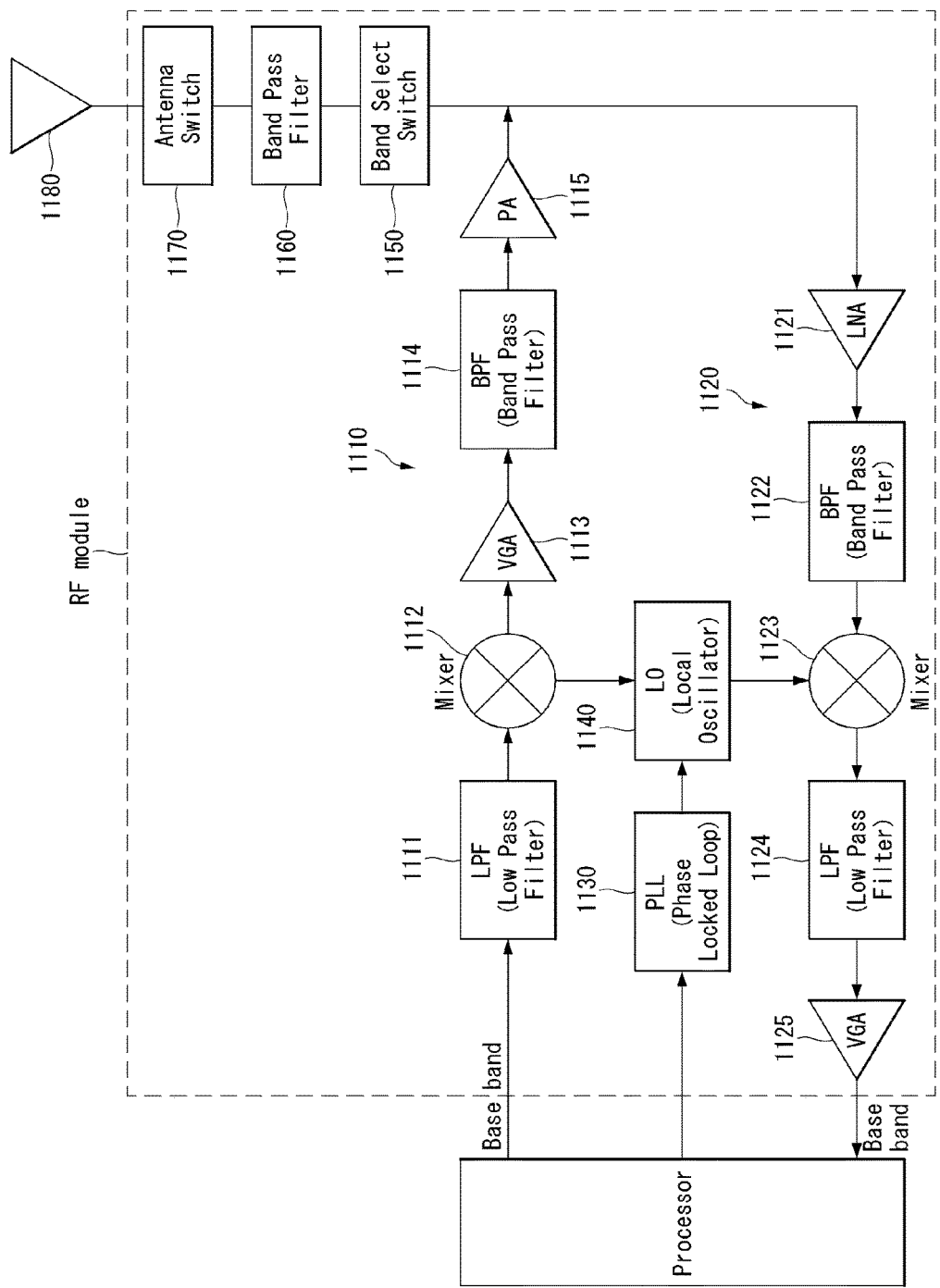
FIG. 11 is a diagram showing another example of the RF module of a wireless communication apparatus to which a method proposed in this specification may be applied.

FIG. 11 is a diagram showing another example of the RF module of the wireless communication apparatus to which a method proposed in this specification may be applied.

Specifically, FIG. 11 shows an example of an RF module that may be implemented in a time division duplex (TDD) system.

The transmitter 1110 and receiver 1120 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 10 for the same structure.

A signal amplified by the power amplifier (PA) 1115 of the transmitter is routed through a band select switch 1150, a band pass filter (BPF) 1160 and an antenna switch(es) 1170 and is transmitted through an antenna 1180.

Furthermore, in a reception path, the antenna 1180 receives signals from the outside and provides the received signals. The signals are routed through the antenna switch(es) 1170, the band pass filter 1160 and the band select switch 1150 and are provided to the receiver 1120.

In accordance with an embodiment of the present invention, there is an effect in that overhead of control information can be reduced and a bundling size can be configured.

Furthermore, in accordance with an embodiment of the present invention, there is an effect in that a bundling size can be flexibly configured or indicated through a small amount of control information.

Furthermore, in accordance with an embodiment of the present invention, there is an effect in that channel estimation performance can be improved by increasing the number of resource blocks to which the same precoder is applied when a scheduled bandwidth is large.

Effects which may be obtained in the present invention are not limited to the above-described effects, and other technical effects not described above may be evidently understood by a person having ordinary skill in the art to which the present invention pertains from the following description The method of transmitting and receiving data in a wireless communication system according to the embodiments of the present invention has been described based on an example in which it is applied to the 3GPP LTE/LTE-A system and the 5G system, but may be applied to various wireless communication systems in addition to the 3GPP LTE/LTE-A system and the 5G system.

What is claimed is:

1. A method of receiving data by a user terminal in a wireless communication system, the method comprising:
receiving, from a base station, configuration information related to a physical resource block (PRB) bundling size of a downlink shared channel, wherein the configuration information comprises a bundling size set consisting of two values among a plurality of candidate values;
receiving, from the base station, downlink control information comprising a bundling size indicator;
based on the bundling size indicator having a specific indicator value, determining the PRB bundling size as one of the two values in the bundling size set, based on whether a size of contiguous scheduled PRBs in a frequency domain exceeds a threshold that is related to a size of a bandwidth part (BWP) for the user terminal; and
receiving downlink data from the base station through the downlink shared channel configured based on the PRB bundling size.

2. The method of claim 1, wherein the plurality of candidate values is equal to {2, 4, W}, where W represents the size of the contiguous scheduled PRBs in the frequency domain.

3. The method of claim 1, wherein the specific indicator value is "1".

4. The method of claim 1, wherein the two values in the bundling size set are equal to either {2, W} or {4, W}, where W represents the size of the contiguous scheduled PRBs in the frequency domain.

5. The method of claim 1, wherein determining the PRB bundling size as the one of the two values in the bundling size set based on whether the size of contiguous scheduled PRBs in the frequency domain exceeds the threshold comprises:
based on the size of the contiguous scheduled PRBs being greater than the threshold, determining the PRB bundling size as a greater value among the two values in the bundling size set.

6. The method of claim 1, wherein determining the PRB bundling size as the one of the two values in the bundling size set based on whether the size of contiguous scheduled PRBs in the frequency domain exceeds the threshold comprises:

based on the size of the contiguous scheduled PRBs being smaller than the threshold, determining the PRB bundling size as a smaller value among the two values in the bundling size set.

7. The method of claim 1, wherein the threshold that is related to the size of the BWP for the user terminal is equal to the size of the BWP divided by 2.

8. A user terminal configured to receive data in a wireless communication system, the user terminal comprising:
a radio frequency (RF) module;
at least one processor; and
at least one computer memory operably connectable to the at least one processor and storing instructions that, when executed, cause the at least one processor to perform operations comprising:
receiving, from a base station, configuration information related to a physical resource block (PRB) bundling size of a downlink shared channel, wherein the configuration information comprises a bundling size set consisting of two values among a plurality of candidate values;
receiving, from the base station, downlink control information comprising a bundling size indicator;
based on the bundling size indicator having a specific indicator value, determining the PRB bundling size as one of the two values in the bundling size set, based on whether a size of contiguous scheduled PRBs in a frequency domain exceeds a threshold that is related to a size of a bandwidth part (BWP) for the user terminal; and
receiving downlink data from the base station through the downlink shared channel configured based on the PRB bundling size.

9. The user terminal of claim 8, wherein the plurality of candidate values is equal to {2, 4, W}, where W represents the size of the contiguous scheduled PRBs in the frequency domain.

10. The user terminal of claim 8, wherein the specific indicator value is "1".

11. The user terminal of claim 8, wherein the two values in the bundling size set are equal to either {2, W} or {4, W}, where W represents the size of the contiguous scheduled PRBs in the frequency domain.

12. The user terminal of claim 8, wherein determining the PRB bundling size as the one of the two values in the bundling size set based on whether the size of contiguous scheduled PRBs in the frequency domain exceeds the threshold comprises:
based on the size of the contiguous scheduled PRBs being greater than the threshold, determining the PRB bundling size as a greater value among the two values in the bundling size set.

13. The user terminal of claim 8, wherein determining the PRB bundling size as the one of the two values in the bundling size set based on whether the size of contiguous scheduled PRBs in the frequency domain exceeds the threshold comprises:
based on the size of the contiguous scheduled PRBs being smaller than the threshold, determining the PRB bundling size as a smaller value among the two values in the bundling size set.

14. The user terminal of claim 8, wherein the threshold that is related to the size of the BWP for the user terminal is equal to the size of the BWP divided by 2.

15. An electronic device configured to control a user terminal to receive data in a wireless communication system, the electronic device comprising:
at least one processor; and
at least one computer memory operably connectable to the at least one processor and storing instructions that, when executed by the at least one processor, cause the user terminal to perform operations comprising:
receiving, from a base station, configuration information related to a physical resource block (PRB) bundling size of a downlink shared channel, wherein the configuration information comprises a bundling size set consisting of two values among a plurality of candidate values;
receiving, from the base station, downlink control information comprising a bundling size indicator;
based on the bundling size indicator having a specific indicator value, determining the PRB bundling size as one of the two values in the bundling size set, based on whether a size of contiguous scheduled PRBs in a frequency domain exceeds a threshold that is related to a size of a bandwidth part (BWP) for the user terminal; and
receiving downlink data from the base station through the downlink shared channel configured based on the PRB bundling size.

* * * * *